United States Patent
Kodama et al.

(10) Patent No.: US 8,556,352 B2
(45) Date of Patent: Oct. 15, 2013

(54) BRAKE FLUID PRESSURE CONTROL DEVICE FOR VEHICLE

(75) Inventors: Takuro Kodama, Nagano (JP);
Motoyasu Nakamura, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 322 days.

(21) Appl. No.: 13/030,554

(22) Filed: Feb. 18, 2011

(65) Prior Publication Data
US 2011/0204708 A1    Aug. 25, 2011

(30) Foreign Application Priority Data
Feb. 19, 2010    (JP) ............................. P2010-035179

(51) Int. Cl.
*B60T 8/40* (2006.01)
(52) U.S. Cl.
USPC .............. 303/116.1; 303/DIG. 10; 303/119.3
(58) Field of Classification Search
USPC ............................................ 137/596.17, 884
See application file for complete search history.

(56) References Cited

U.S. PATENT DOCUMENTS

| | | | | |
|---|---|---|---|---|
| 5,577,813 | A * | 11/1996 | Zaviska ...................... | 303/116.4 |
| 6,260,933 | B1 * | 7/2001 | Dinkel et al. .............. | 303/113.1 |
| 7,500,725 | B2 * | 3/2009 | Otomo et al. ............. | 303/119.3 |
| 7,753,456 | B2 * | 7/2010 | Iyatani ....................... | 303/119.3 |
| 2007/0075582 | A1 | 4/2007 | Nakayama et al. | |
| 2008/0136253 | A1 | 6/2008 | Nishikawa et al. | |
| 2010/0207446 | A1 * | 8/2010 | Tandler et al. ................... | 303/10 |
| 2010/0264723 | A1 * | 10/2010 | Atsushi et al. .................. | 303/10 |

FOREIGN PATENT DOCUMENTS

| | | |
|---|---|---|
| JP | 05319237 A | 12/1993 |
| JP | 3038703 U | 4/1997 |
| JP | 10194113 | 7/1998 |
| JP | 11043034 | 2/1999 |
| JP | 2003320664 A | 11/2003 |
| JP | 3701669 | 7/2005 |
| JP | 2005291316 A | 10/2005 |
| JP | 200799001 A | 4/2007 |
| JP | 2008132925 A | 6/2008 |
| WO | WO9408830 | 4/1994 |

OTHER PUBLICATIONS

Japanese Patent Office Action for Appl. No. 2010-035179 dated Dec. 20, 2011.
Japanese Patent Office Action for Appl. No. 2010-035179 dated Jul. 20, 2012.

* cited by examiner

*Primary Examiner* — Pamela Rodriguez
(74) *Attorney, Agent, or Firm* — Andrew M. Calderon; Roberts Mlotkowski Safran & Cole, P.C.

(57) ABSTRACT

A brake fluid pressure control device has a base unit. The base unit includes an inlet valve mounting hole, an outlet valve mounting hole, a reservoir hole, a cylinder hole, an inflow hole, a suction hole, and a discharge hole. A plunger is inserted into the cylinder hole. The inflow hole connects the outlet valve mounting hole and the reservoir hole. The suction hole connects the reservoir hole and the cylinder hole. The discharge hole connects the cylinder hole and the inlet valve mounting hole. The suction hole is inserted with a suction valve that allows only an inflow of the brake fluid into the cylinder hole. The discharge hole is inserted with a discharge valve that allows only a discharge of the brake fluid from the cylinder hole. The inflow hole and the suction hole are arranged to be substantially in parallel with each other.

21 Claims, 5 Drawing Sheets

BRAKE FLUID PRESSURE CONTROL DEVICE FOR VEHICLE

CROSS REFERENCE TO RELATED APPLICATION(S)

The present disclosure relates to the subject matters contained in Japanese Patent Application No. 2010-035179 filed on Feb. 19, 2010, which are incorporated herein by reference in its entirety.

BACKGROUND

1. Field

The present invention relates to a brake fluid pressure control device for vehicle.

2. Description of the Related Art

A brake fluid pressure control device for a vehicle, which controls hydraulic pressure of brake fluid in wheel cylinders, is provided therein with a base unit which is assembled therein with electronic valves, motors, plunger pumps, and a control circuit board that controls the electronic valves to open and close and controls the motor.

In the brake fluid pressure control device for a vehicle, the base unit is formed therein with fluid passages for communicating master cylinders and wheel cylinders. The brake fluid pressure control device controls the electronic valves or the motors operate in accordance with an operation of a vehicle, to thereby vary hydraulic pressures of brake fluid in fluid passages.

The base unit of the brake fluid pressure control device for a vehicle is provided with valve mounting holes which are mounted therein with inlet valves or outlet valves, reservoir holes mounted with reservoirs and cylinder holes into which plungers of plunger pumps are inserted, and the outlet valve mounting holes are communicated at a middle portion of a suction hole which becomes fluid passage for making the cylinder holes communicate with the reservoir holes. An example of a conventional brake fluid pressure control device is disclosed in Japanese Patent No. 3701669 (counterpart international patent application is published as WO/1994/008830).

In this configuration, when the outlet valve is opened, brake fluid flows into the reservoir through the suction hole from the outlet valve, and when plunger pump operates in a state of the outlet valve closed, brake fluid in the reservoir is suctioned into the plunger pump through the suction hole.

Such a conventional base unit employs the same fluid passage (suction hole), which used in order for a plunger pump to suck a brake fluid from a reservoir, as that fluid passage which is used to make a brake fluid flow into the reservoir, and accordingly it cannot make the cross-sectional area (inside diameter) of the fluid passage change. Accordingly, there are less degree of freedom for designing a fluid passage within a base unit.

For example, to enhance efficiency of a plunger pump, it is preferable that the cross-sectional area of a suction hole communicating with a reservoir is enlarged. However, in a conventional brake fluid pressure control device for a vehicle, two seal members are mounted to a piston of a plunger pump and a suction valve is arranged between the two seal members. Accordingly, since the diameter of the suction hole (cross-sectional area) is dependent on a slip-movement amount of a plunger pump, the diameter of the suction hole may not be enlarged beyond a limited size.

SUMMARY

One of objects of the present invention is to provide a brake fluid pressure control device for vehicle capable of increasing the degree of freedom for designing a fluid passage within a base unit.

According to an embodiment of the present invention, there is provided a brake fluid pressure control device for a vehicle. The brake fluid pressure control device includes: an inlet valve that is configured by a normally opened type electronic valve; an outlet valve that is configured by a normally closed type electronic valve; a reservoir that temporarily stores a brake fluid; a plunger pump that suctions the brake fluid stored in the reservoir; and a base unit having a fluid passage that connects a master cylinder and a wheel cylinder. The base unit includes: an inlet valve mounting hole in which the inlet valve is mounted; an outlet valve mounting hole in which the outlet valve is mounted; a reservoir hole in which the reservoir is mounted; a cylinder hole into which a plunger of the plunger pump is inserted to freely slide in the cylinder hole; an inflow hole that connects the outlet valve mounting hole and the reservoir hole; a suction hole that connects the reservoir hole and the cylinder hole; and a discharge hole that connects the cylinder hole and the inlet valve mounting hole, wherein the suction hole is configured to be inserted with a suction valve that allows only an inflow of the brake fluid into the cylinder hole, wherein the discharge hole is configured to be inserted with a discharge valve that allows only a discharge of the brake fluid from the cylinder hole, and wherein the inflow hole and the suction hole are arranged to be substantially in parallel with each other.

In this configuration, the inflow hole and the suction hole are formed separately so that the cross-sectional area of a fluid passage may be set according to each of the objects, thereby the degree of freedom may be enhanced when the fluid passage within the base unit is designed. Accordingly, a suction efficiency of a plunger pump may be enhanced by enlarging the cross-sectional area of a suction hole.

In addition, since the inflow hole and the suction hole may be processed from a same direction to form the base unit, the processability of the fluid passage may be enhanced. Particularly, in a case where an axial direction of the suction hole and an axial direction of the inflow hole are in parallel each other, the processability of the fluid passage may be further enhanced.

In the brake fluid pressure control device for a vehicle, when the outlet valve mounting hole is arranged between the cylinder hole and the reservoir hole, the inflow hole is shortened, thereby the base unit may be miniaturized.

In the brake fluid pressure control device for a vehicle, when a cross-sectional area of the suction hole is formed to be larger than a cross-sectional area of the inflow hole, a suction efficiency from the reservoir into the plunger pump may be improved.

In the brake fluid pressure control device for a vehicle, it is preferable that the suction valve is disposed at a position displaced from the center of the suction hole toward the reservoir hole. In this configuration, since a brake fluid is sucked from the reservoir by means of a suction action occurring in a suction valve disposed near the reservoir, a suction efficiency of the plunger pump from the reservoir may be improved.

In the brake fluid pressure control device for a vehicle, when the base unit includes an inlet port that is connected to a pipe extended to the master cylinder, the discharge hole is communicated with a master cylinder connection hole communicated with the inlet port, and the cross-sectional area of the discharge hole is formed to be larger than the cross-sectional area of the master cylinder connection hole, a discharge efficiency of the plunger pump may be improved.

Also, when the cross-sectional area of the master cylinder connection hole is formed to be narrower than the area of the discharge hole, surging of a brake fluid discharged from the plunger pump may be damped by an orifice effect because a communicating portion of the discharge hole and the master cylinder connection hole functions as an orifice.

Also, when the discharge valve is disposed at a position displaced from the center of the discharge hole toward the cylinder hole, a space within the discharge hole from the discharge valve to the master cylinder connection hole may function as a damper chamber which damps surging of a brake fluid discharged from the plunger pump.

In the brake fluid pressure control device for a vehicle, in a case where one end of the discharge hole is communicated with the cylinder hole, the other end thereof is sealed by a cover member, the plunger is inserted into an inside of the end side of the cylinder hole, and the other end is sealed by the cover member, it is preferable that the cover member of the discharge hole and the cover member of the cylinder hole are formed in a same shape. In this manner, manufacturing cost may be reduced by sharing of parts.

In the brake fluid pressure control device for a vehicle, in a case where the cylinder hole is connected to a bearing hole at one end thereof, the bearing hole being inserted with an output shaft of a motor, and the inlet valve mounting hole and outlet valve mounting hole are arranged between the suction hole, the discharge hole and the bearing hole in an axial direction of the cylinder hole, space within the base unit may be used efficiently thereby the base unit may be miniaturized.

It is preferable that such a brake fluid pressure control device for a vehicle is applied to a brake fluid pressure control device that the base unit includes: a first fluid passage section for a first brake system of a first wheel brake; and a second fluid passage section for a second brake system of second wheel brake, wherein each of the first fluid passage section and the second fluid passage section is provided with the inlet valve mounting hole and the outlet valve mounting hole. Particularly, it is preferable that the brake fluid pressure control device for a vehicle is installed in a bar handle type of a vehicle.

The brake fluid pressure control device for a vehicle of the present invention may serve to enhance the processability of fluid passage together with enhancement of the degree of freedom when a fluid passage of the base unit is designed.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENT(S)

Figure 1:
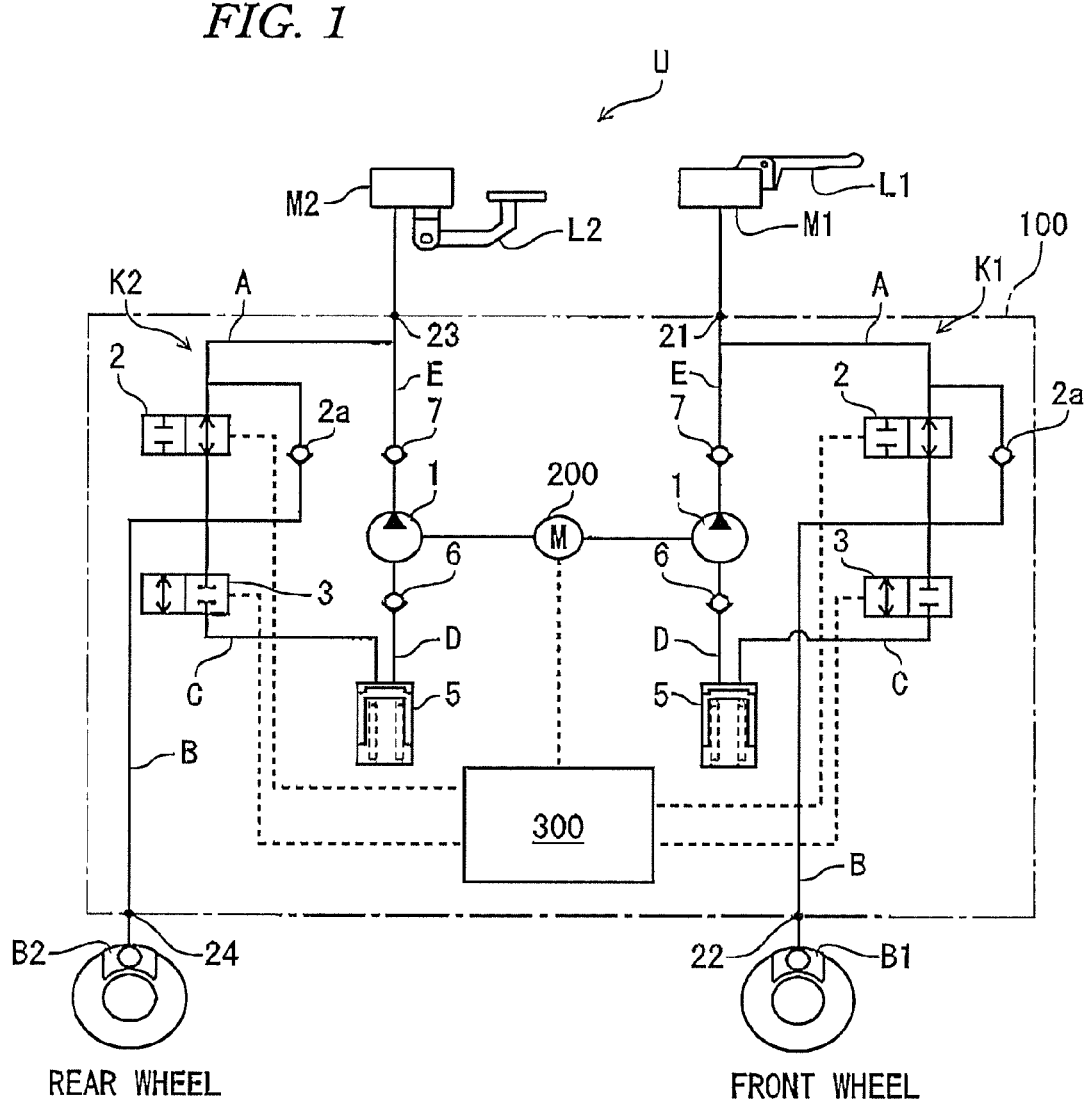
FIG. 1 is a view showing a hydraulic pressure circuit of a brake fluid pressure control device for vehicle according to an embodiment of the present invention.

Embodiments according to the present invention will be described in detail with reference to the accompanying drawings. The scope of the claimed invention should not be limited to the examples illustrated in the drawings and those described below.

As shown in FIG. 1, a brake fluid pressure control device U according to the embodiment is preferably used in a vehicle having a bar handle, such as a motorcycle, an automotive three-wheeled vehicle, and an all-terrain vehicle (ATV).

The brake fluid pressure control device U is provided therein with brake systems K1, K2 having fluid passages A, B for connecting master cylinders M1, M2 and wheel cylinders B1, B2, and a controller 300.

The brake fluid pressure control device U is configured to control anti-lock braking of each of the wheel cylinders B1, B2 by appropriately controlling a hydraulic pressure of the brake fluid that is applied to the wheel cylinder B1 mounted in a front wheel brake and the wheel cylinder B2 mounted in a rear wheel brake.

A brake system K1 of a front wheel brake (hereinafter, referred to as "front wheel brake system K1") is a system extended from an inlet port 21 to an outlet port 22. The inlet port 21 of the front wheel brake system K1 is connected to a pipe extended to a master cylinder M1 which is a hydraulic pressure source, and the outlet port 22 is connected to a pipe extended to a wheel cylinder B1 of the front wheel brake.

A brake system K2 of a rear wheel brake (hereinafter, referred to as "rear wheel brake system K2") is a system extended from an inlet port 23 to an outlet port 24. The inlet port 23 of the rear wheel brake system K2 is connected to a pipe extended to a master cylinder M2 which is a hydraulic pressure source separately from the master cylinder M1, and the outlet port 24 is connected to a pipe extended to a wheel cylinder B2 of the rear wheel brake.

Although the brake fluid pressure control device U is configured to have the two brake systems K1, K2, the configuration for braking the wheel cylinder B2 in the rear wheel brake system K2 is substantially the same to the configuration of the front wheel brake K1. Thus, hereinafter, the front wheel brake system K1 will mainly be described, but the rear wheel brake system K2 will not be described.

The master cylinder M1 of the front wheel brake system K1 has a cylinder hole (not shown) connected to a tank for storing a brake fluid, and the cylinder hole is assembled therein with a master piston (not shown).

The master cylinder M1 serves to discharge a brake fluid by the master piston that freely slide along an axial direction of the cylinder hole according to a manipulation of a brake lever L1 which is an operator of a brake.

Meanwhile, the master cylinder M2 of the rear wheel brake system K2 is connected to a brake pedal L2 as a brake operation element.

The front wheel brake system K1 is installed therein with an inlet valve 2, a check valve 2a and an outlet valve 3 in response to the wheel cylinder B1 of the front wheel brake. Also, the brake system K1 of the front wheel brake is installed therein with a reservoir 5 and a plunger pump 1.

Meanwhile, hereinafter, a fluid passage extended from the inlet port 21 to the suction valve 6 is referred to as "output fluid passage A", and a fluid passage extended from the inlet valve 2 to the outlet port 22 is referred to as "vehicle fluid passage B". Also, a fluid passage extended from the vehicle fluid passage B to the reservoir 5 is referred to as "inflow fluid passage C", and a fluid passage extended from the reservoir 5 to the plunger pump 1 is referred to as "suction fluid passage D". A fluid passage extended from the plunger pump 1 to the output fluid passage A is referred to as "discharge fluid passage E". Also, upper current side means the master cylinder M1 side, and lower current side means the wheel cylinder B1 side.

The inlet valve 2 is an electronic valve of a normally opened type which is installed between the output fluid passage A and the wheel fluid passage B. The inlet valve 2 allows an inflow of a brake fluid from an upper current side to a lower current side in an opened state, and blocks the inflow in a closed state.

The normally opened type of electronic valve, which forms the inlet valve 2, is electrically connected to the controller 300 at an electronic coil thereof for operating the valve body, is closed when the electronic coil is excited, and is opened when the electronic coil is degaussed, in response to an instruction of the controller 300.

The check valve 2a is a valve which allows only an inflow of brake fluid from a lower current side into an upper current side, and connected in parallel to the inlet valve 2.

The outlet valve 3 is configured by an electronic valve of a normally closed type which is installed on an inflow passage C, blocks an inflow of a brake fluid from the wheel fluid passage B side to the reservoir 5 side in a closed state, and allows the inflow in an opened state.

The electronic valve of a normally closed type, which serves as the outlet valve 3, is connected to the controller 300 at an electronic coil thereof for driving the valve body, is opened when the electronic is excited and is closed when the electronic coil is degaussed, in response to an instruction of the controller 300.

The reservoir 5 is communicated with the inflow fluid passage C and the suction fluid passage D, and has a function capable of temporarily storing a brake fluid released from the wheel fluid passage B to the inflow fluid passage C when the outlet valve 3 is opened. Also, the reservoir 5 is connected to the plunger pump 1 through the suction fluid passage D.

The plunger pump 1 is installed between the suction fluid passage D and the discharge fluid passage E. The plunger pump 1 is driven by a rotary power of the motor 200, and suctions a brake fluid from the reservoir 5 through the suction fluid passage D to thereby discharge the brake fluid to the discharge fluid passage.

Also, the suction fluid passage D is installed thereon with a suction valve 6 which allows only a suction of brake fluid into the plunger pump 1. The discharge fluid passage E is installed thereon with a discharge valve 7 which allows only a discharge of brake fluid from the plunger pump 1.

The motor 200 is a common power source of each of the plunger pumps 1, 1 of the front wheel brake system K1 and the rear wheel brake system K2, and is an electromotive device an output shaft of which operates in response to an instruction of the controller 300.

The controller 300 controls operations of the inlet valve 2, the outlet valve 3 and the motor 200 and detects a movement of a vehicle based on an output of a wheel speed sensor to thereby control opening/closing of the inlet valve 2 and the outlet valve 3 and an operation of the motor 200.

By referring to the fluid passage shown in FIG. 1, a normal braking control and a braking control using an anti-lock braking system that is executed by the controller when manipulating the brake lever L1 of the front brake system K1 will be described.

In the normal brake control, in which there is less possibility that a front wheel is locked, each of the electronic coils for driving the inlet valve 2 and the outlet valve 3 which are attached to the base unit 100 is degaussed by the controller 300. That is, during the normal brake control, the inlet valve 2 becomes an opened state and the outlet valve 3 becomes a closed state.

Under such a state, when a driver manipulates the lever L1, a hydraulic pressure of the brake fluid generated at the master cylinder M1 by the manipulation is directly transmitted to the wheel cylinder B1 of the front wheel brake through the output fluid passage A and the wheel fluid passage B, thereby putting the brakes on the front wheels.

Also, when the brake lever L1 is released, the brake fluid that has flowed into the wheel fluid passage B is returned to the master cylinder M2 through the output fluid passage A.

The anti-lock braking control, which is executed at the time when wheels will just be locked, is realized by properly selecting states of raising, reducing, or uniformly maintaining a hydraulic pressure of the brake fluid acting on the wheel cylinder B1. Meanwhile, the controller 300 determines whether to select any one among reducing, raising, and maintaining of the pressure, based on a vehicle wheel speed detected by a vehicle wheel speed sensor installed near front wheels.

When the controller 300 determines to reduce a hydraulic pressure of the brake fluid acting on the wheel cylinder B1, the controller 300 makes the inlet valve 2 excited to be a closed state, and at the same time, makes the outlet valve 3 excited to be an opened state. In this manner, the brake fluid, which flows on the wheel fluid passage B communicated with the wheel cylinder B1, flows into the reservoir 5 through the inflow fluid passage C. As a result, the hydraulic pressure of the brake fluid acting on the wheel cylinder B1 is reduced.

Also, in a case where the controller 300 determines to uniformly maintain the hydraulic pressure of the brake fluid acting on the wheel cylinder B1, the controller 300 makes the inlet valve 2 excited to be a closed state, and at the same time, makes the outlet valve 3 degaussed to be a closed state. In this manner, the brake fluid is confined within the closed fluid passage by the wheel cylinder B1, inlet valve 2 and outlet valve 3, as a result, the hydraulic pressure of the brake fluid acting on the wheel cylinder B1 is uniformly maintained.

Also, in a case where the controller 300 determines to raise the hydraulic pressure of the brake fluid acting on the wheel cylinder B1, the controller 300 makes the inlet valve 2 excited to be an opened state, and at the same time, makes the outlet valve 3 degaussed to be a closed state. In addition, if the controller 300 drives the motor 200, the plunger pump 1 operates in response to an operation of the motor 200, and the brake fluid stored in the reservoir is thereby refluxed into the output fluid passage A through the discharge fluid passage E.

Meanwhile, during a manipulation of the brake pedal L2 of the rear wheel brake system K2, controlling of various kinds of brakes of the wheel cylinder B2 of the rear wheel brake, which is realized by the controller 300, is executed in the same manner as controlling of various kinds of brakes of the wheel cylinder B1 of the front wheel brake as described previously.

Next, a detailed configuration of the brake fluid pressure control device U will now be described.

The brake fluid pressure control device U shown in FIG. 1 is provided therein with a base unit 100 which is assembled therein with inlet valves 2, outlet valves 3, plunger pumps 1 and a motor 200, etc. (see FIG. 1), and a controller 300.

Meanwhile, in the description below, although "upper", "lower", "left", and "right" directions are based on the perspective state view of FIG. 3, the directional relative terms may be used herein for ease of description to describe one element or feature's relationship to another element(s) or feature(s) as illustrated in the figures. It will be understood that the directional relative terms may not correspond to the actual orientation of the brake fluid pressure control device U in a state installed in a vehicle. Also, the reference plane X and the reference plane Y shown in FIGS. 3 and 4 are crossed orthogonally to each other.

The base unit 100 is a metal part formed about in a rectangular parallelepiped shape, attached and fixed in a single body to a housing 301 of the controller 300 at a front face 101 thereof and attached and fixed in a single body to the motor 200 at a rear face 102.

The base unit 100 is formed at an inside thereof with a fluid passage for connecting the master cylinders M1, M2 (see FIG. 1) and the wheel cylinders B1, B2 (see FIG. 1). The control circuit board of the controller 300 operates the inlet valves 2, outlet valves 3 and motor 200 based on a movement of a vehicle body, thereby the hydraulic pressure of the brake fluid in a fluid passage varies.

Figure 3:
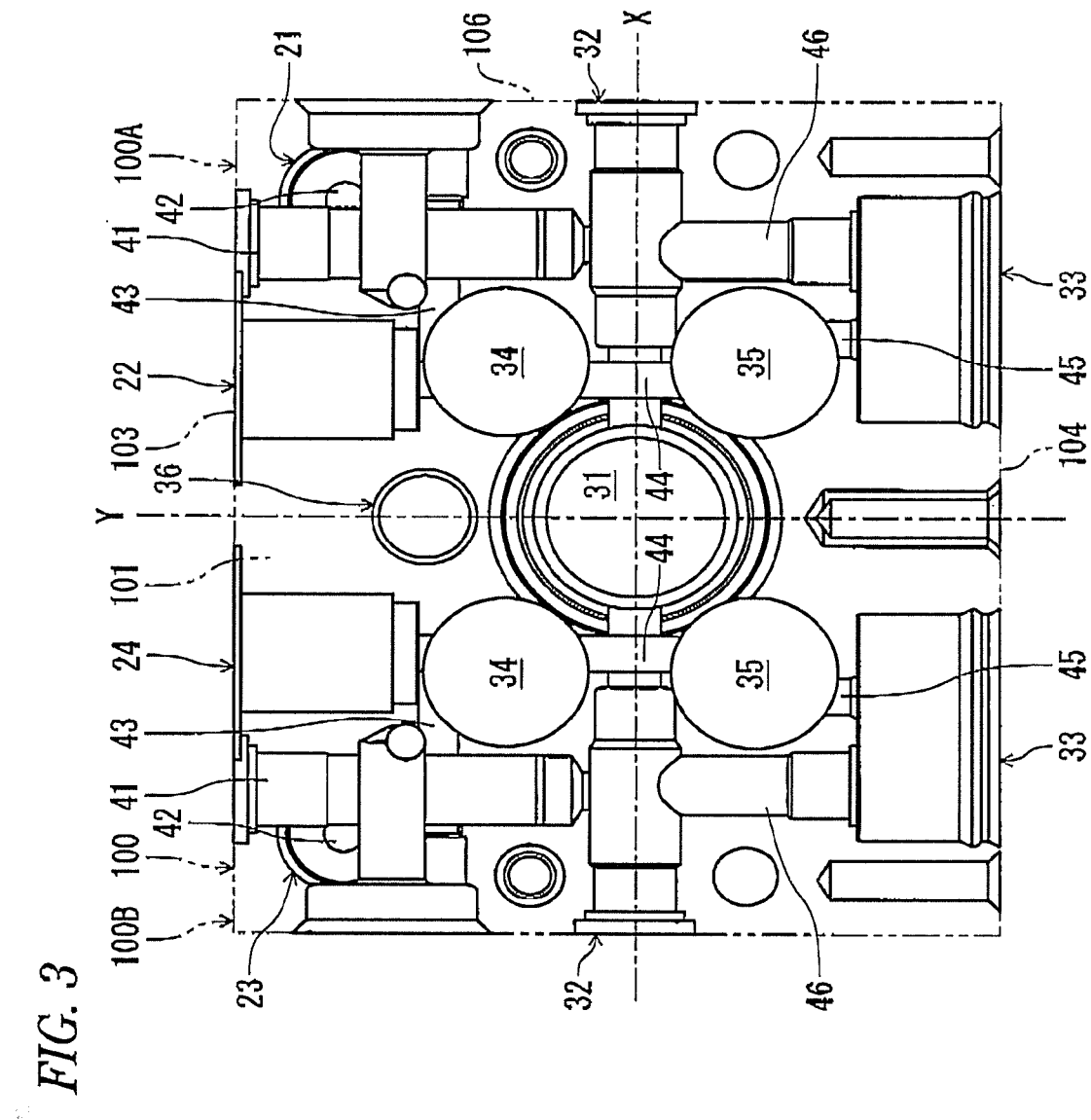
FIG. 3 is a perspective view showing a fluid passage section of the brake fluid pressure control device when viewed from a front side according to the embodiment.
Figure 4:
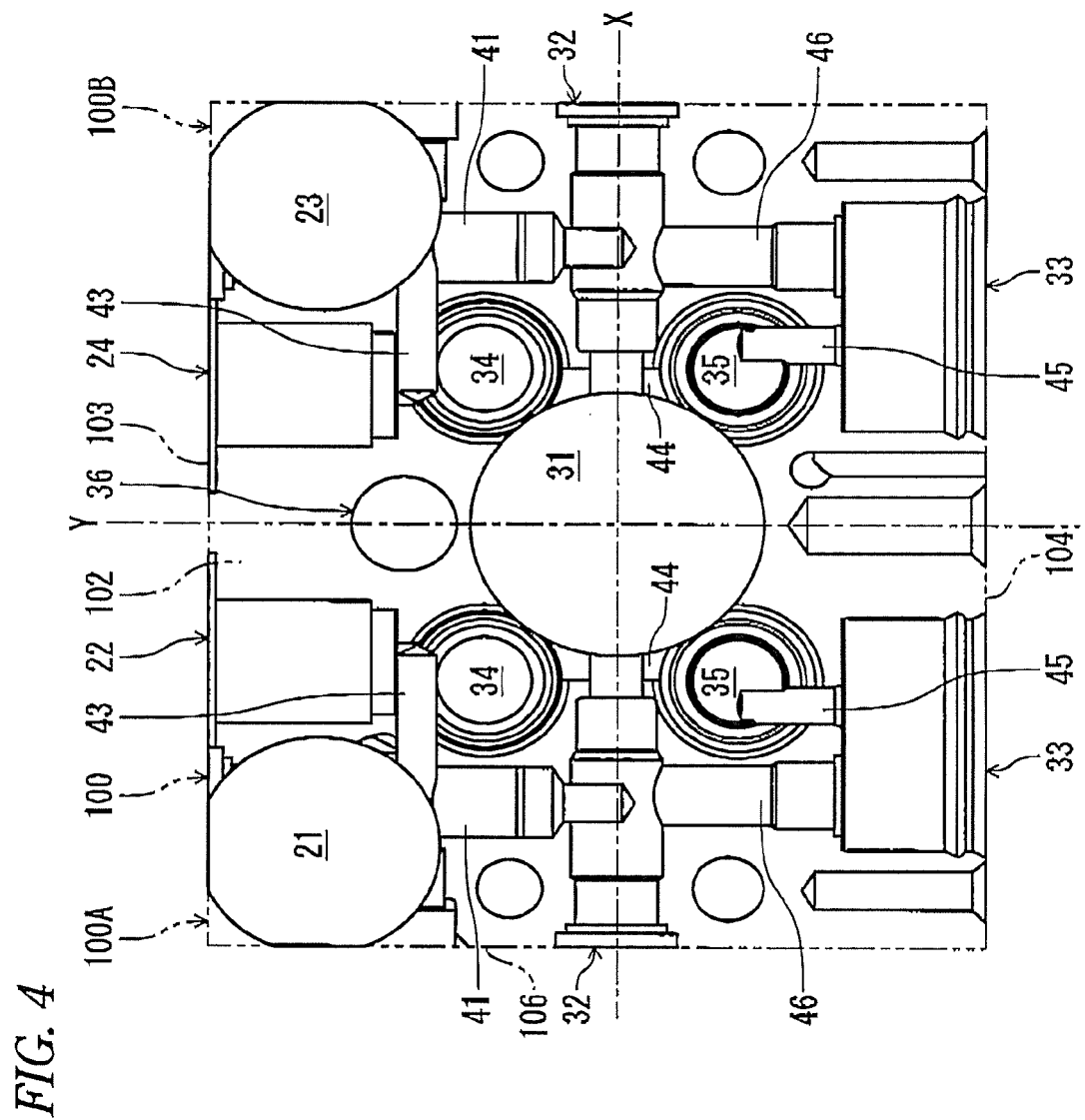
FIG. 4 is a perspective view showing the fluid passage section of the brake fluid pressure control device when viewed from a rear side according to the embodiment.

As shown in FIG. 3, the base unit 100 is formed at a right half in FIG. 3 (right region relative to a reference plane Y shown in FIG. 3) with a fluid passage section 100A responding to the front wheel brake system K1 (see FIG. 1), and formed at a left half in FIG. 3 (left region with respect to a reference plane Y) with a fluid passage section 100B responding to the rear wheel brake system K2 (see FIG. 1).

Incidentally, since the fluid passage sections 100A, 100B is arranged practically symmetrically with respect to each other including the inside configurations, hereinafter, only the fluid passage section 100A will be described, but the fluid passage section 100B will not be described.

The fluid passage section 100A, as shown in FIG. 3 and FIG. 4, is provided therein with an inlet port 21, an outlet port 22, a bearing hole 31, a cylinder hole 32, a reservoir hole 33, an inlet valve mounting hole 34, an outlet valve mounting hole 35, holes 41 to 46 for communicating these elements.

The inlet port 21 is an opened-bottomed cylinder shaped hole disposed at an upper side corner of a rear face 102 of the base unit 100, and is a portion which is connected to a pipe extended from the master cylinder M1 (see FIG. 1).

The outlet port 22 is an opened-bottomed cylinder shaped hole disposed at an upper face 103 of the base unit 100, and arranged closer to the center side (reference plane Y side) of the base unit 100 than the inlet port 21. The outlet port 22 is connected to a pipe extended to a wheel cylinder B1.

The bearing hole 31 is an opened-bottomed cylinder shaped hole, which is formed at the center of the rear face 102 of the base unit 100, and the center point of the bearing hole 31 is disposed at the intersection of the reference plane Y and the reference plane X. the bearing hole 31 is a portion in which an output shaft of the motor 200 (see FIG. 2) is inserted. Also, a terminal hole 36 is formed at an upper side of the bearing hole and opened so that a bus bar of the motor 200 may be inserted therethrough. The center point of the terminal hole 36 is disposed on the reference plane Y.

The cylinder hole 32 is a hole one end of which is communicated with the bearing hole 31, and the other end of which is opened at a right face 106. The axial center line of the cylinder hole 32 is formed on the reference plane X shown in FIG. 3, and extended in left and right directions through the center of the bearing hole 31. The cylinder hole 32 is inserted therein with a plunger 1c (see FIG. 5) of the plunger pump 1, which will be described later, so that the plunger 1c may be freely slide therein.

The reservoir hole 33 is an opened-bottomed cylinder shaped hole formed at a lower face 104 of the base unit 100. The reservoir hole 33 is mounted therein with the reservoir 5 (see FIG. 5).

The inlet valve mounting hole 34 is a cylinder shaped hole having an opened bottom at a front face 101 of the base unit 100, and is disposed between the outlet port 22 and the cylinder hole 32. The inlet valve mounting hole 34 is mounted therein with an inlet valve 2 (see FIG. 1).

The outlet valve mounting hole 35 is a cylinder shaped hole having an opened bottom at a front face 101 of the base unit 100, and is disposed between the cylinder hole 32 and the reservoir hole 33 at a lower side of the inlet valve mounting hole 34. The outlet valve mounting hole 35 is mounted therein with an outlet valve 3 (see FIG. 1).

The discharge hole 41 is a cylinder shaped hole which is communicated with the cylinder hole 32 from the upper face 103 of the base unit 100, and is extended upward and downward. Particularly, an axial line of the discharge hole 41 is crossed at right angles to an axial line of the cylinder hole 32. A portion of the discharge hole 41, which is extended from the cylinder hole 32 to the output hole 43, corresponds to "discharge fluid passage E" shown in FIG. 1. An opened edge portion of the opening end 41b of the cylinder hole 32 side is formed smaller in its diameter than the other portion in the discharge hole 41.

The discharge hole 41 is arranged close to a right face 106 side (see FIG. 3) of the base unit 100 compared with the inlet valve mounting hole 34, and a lower portion of the discharge hole 41 is communicated with about a center portion of the cylinder hole 32 when viewed in left and right directions. Accordingly, an inlet valve mounting hole 34 is arranged between the discharge hole 41 and the bearing hole 31 when viewed in an axial direction of the cylinder hole 32.

Figure 5:
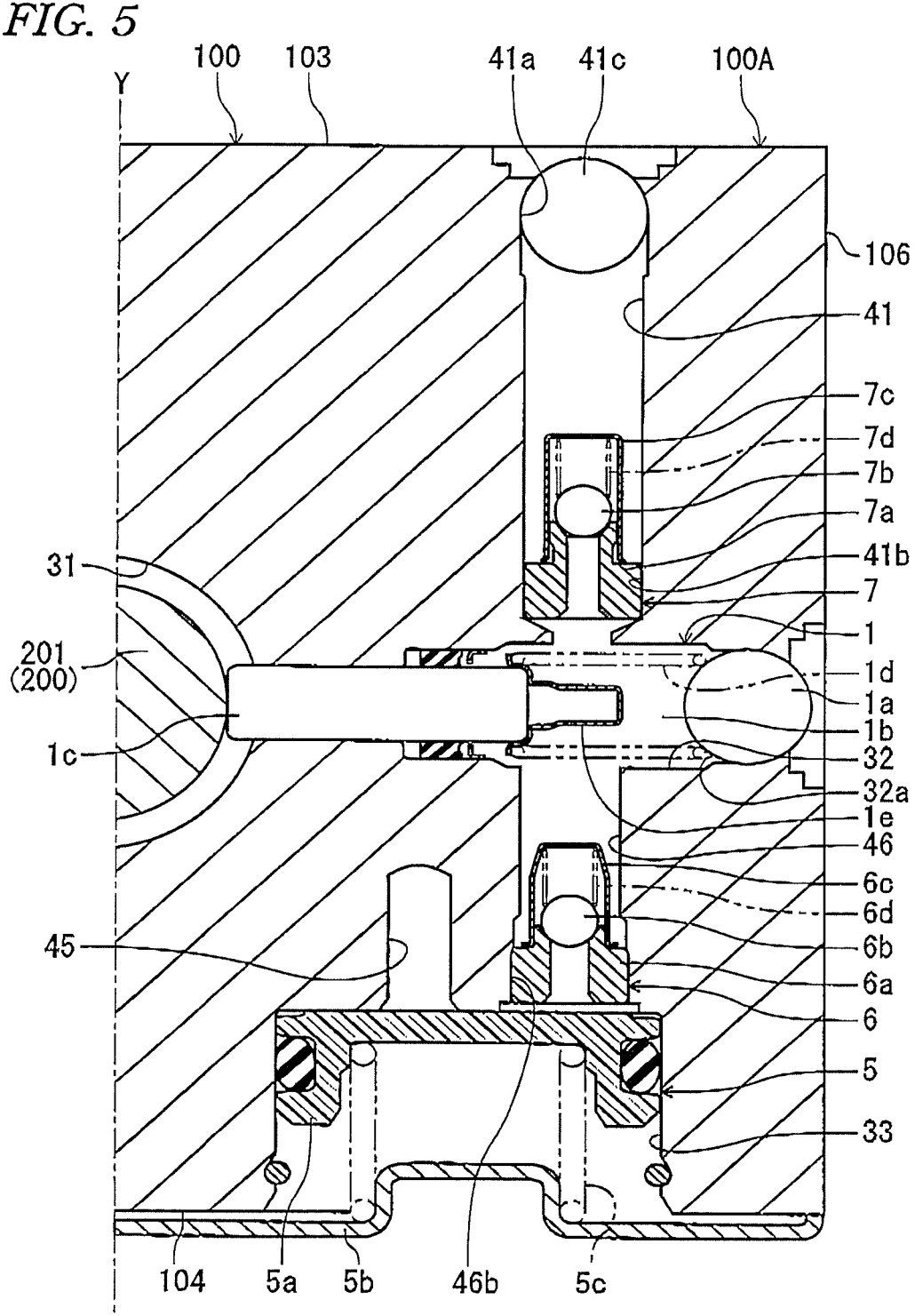
FIG. 5 is a cross sectional side view showing a reservoir and a plunger pump of the brake fluid pressure control device according to the embodiment.

Also, as shown in FIG. 5, a cover member 41c, which is a metal made sphere, is fitted into the opening end 41a of the upper face 103 side of the discharge hole 41, and one end of the discharge hole 41 is sealed by the cover member 41c.

Figure 2:
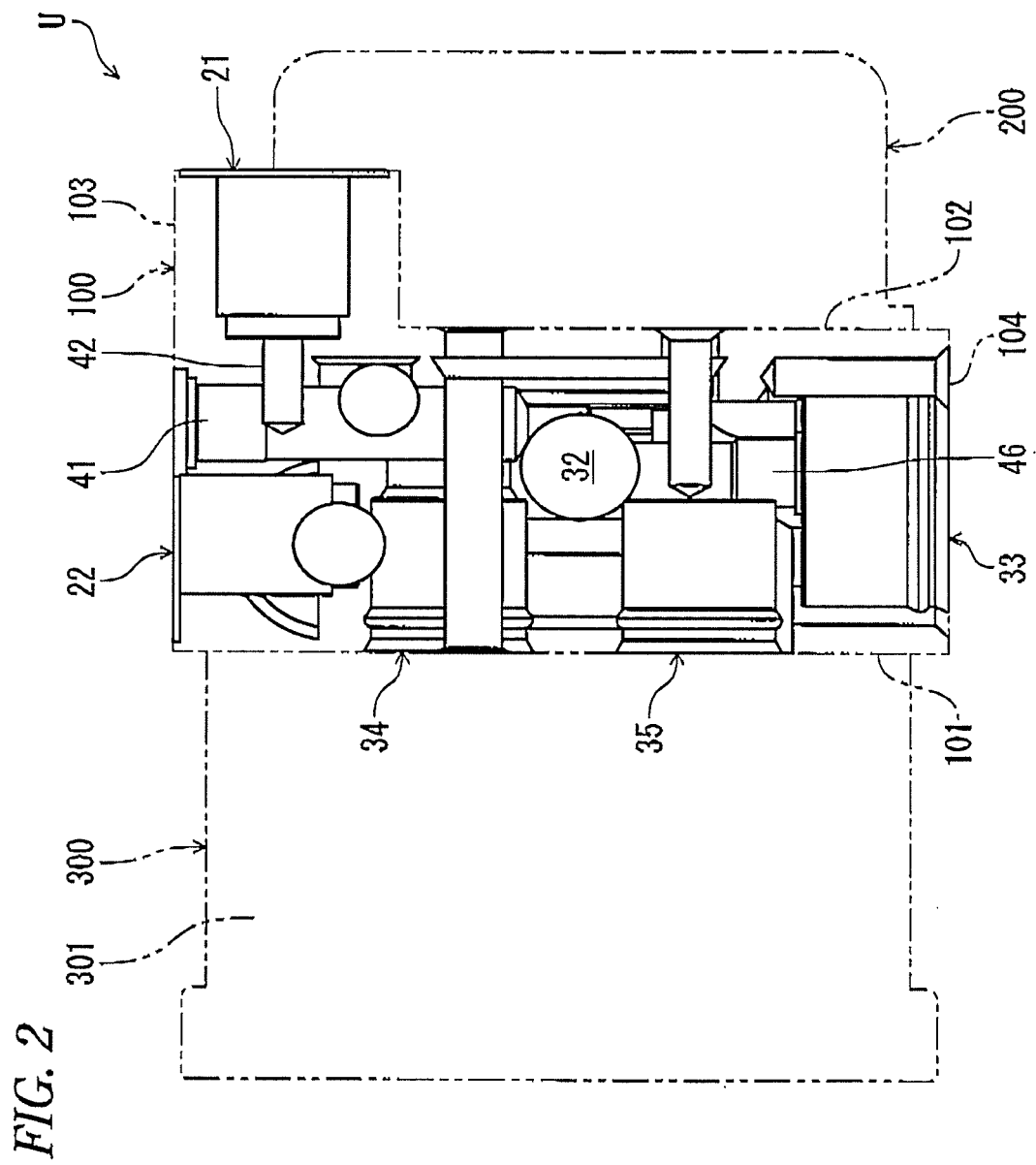
FIG. 2 is a perspective view showing the brake fluid pressure control device when viewed from a side according to the embodiment.

The master cylinder connection hole 42, as shown in FIG. 2, is a cylinder shaped hole which is communicated from a bottom of the inlet port 21 to the discharge hole 41, and extended in forward and rearward directions. The cross-sectional area (inside diameter) of the master cylinder connection hole 42 is formed smaller than the cross sectional area (inside diameter) of the discharge hole 41.

The output hole 43, as shown in FIGS. 3 and 4, is a fluid passage which is communicated from the discharge hole 41 to the inlet valve mounting hole 34 and is extended in left and right directions.

A portion between the master cylinder connection hole and the output hole 43 among the master cylinder connection hole 42, the output hole 43 and the discharge hole 43 forms "output fluid passage A" shown in FIG. 1.

The electronic valve connection hole 44 is a cylinder shaped hole which is communicated from a bottom of the outlet port 24 to the inlet valve mounting hole 34 and the outlet valve mounting hole 35 and is extended in upper and lower directions.

The inflow hole 45 is a cylindrical hole that is communicated from the outlet valve mounting hole 35 to a bottom portion of the reservoir hole 33 and extended in upper and lower directions. Particularly, an axial line of the inflow hole 45 is in parallel with an axial line of the discharge hole 41. The inflow hole 45 forms "inflow fluid passage C" shown in FIG. 1.

The suction hole 46 is a cylindrical hole that is communicated from a bottom of the reservoir hole 33 to the cylinder hole 32, and is extended in upper and lower directions. In detail, an axial line of the suction hole is crossed at right angles to an axial line of the cylinder hole 32 likewise with the discharge hole 41. The suction hole 46 forms "suction fluid passage D" shown in FIG. 1.

The suction hole 46 is arranged close to a right face 106 side (right in FIG. 3) of the base unit 100 compared with the outlet valve mounting hole 35, and an upper portion of the suction hole 46 is communicated with about a center portion of the cylinder hole 32 when viewed in left and right directions. Accordingly, the discharge valve mounting hole 35 is arranged between the suction hole 46 and the bearing hole 31 in an axial direction of the cylinder hole 32.

The opening end 46b of the suction hole 46 at the reservoir hole 33 side is expanded in its diameter. The suction hole 46 and the discharge hole 41 are arranged in upper and lower directions with the cylinder hole 32 interposed therebetween.

Also, the suction hole 46 and the inflow hole 45 are arranged in parallel with each other, and an axial line of the suction hole 46 and an axial line of the inflow hole are in parallel. The cross sectional area (inside diameter) of the suction hole 46 is formed larger than the cross sectional area (inside diameter) of the inflow hole 45.

Next, configurations of the reservoir 5 and the plunger pump 1 which are mounted in the base unit 100 will be described in detail.

The reservoir 5, as shown in FIG. 5, includes a piston 5a which is mounted to be freely slide within the reservoir hole 33, a board shaped spring supporting member 5b which is attached to a lower face 104 of the base unit 100 to close the opening of the reservoir hole 33, and a coil spring 5c which is installed between the piston 5a and the spring supporting member 5b to press the piston 5a toward a lower face of the reservoir hole 33.

The reservoir hole 33 is communicated with the inflow hole 45 and the suction hole 46 at a lower face thereof. When a brake fluid is flows into the reservoir hole 33 from the inflow hole 45, the piston 5a moves toward the spring supporting member 5b side (a lower face 104 of the base unit 100) against elastic forces of the coil spring 5c, thereby a brake fluid is stored in the reservoir hole 33.

The plunger pump 1, as shown in FIG. 5, includes a cover member 1a which seals an opening end 32a of the right face 106 side in the cylinder hole 32, a plunger 1c which is mounted in the cylinder hole 32 to be freely slide therein and serves to form a pump chamber 1b therebetween together with the cover member 1a, and a coil spring 1d which is arranged in the pump chamber 1b and presses the plunger 1c toward the eccentric cam 201.

The cover member 1a is a metal-made sphere that is fitted into the opening end 32a of the cylinder hole 32. The cover member 1a is formed in the same shape as the cover member 41c which is fitted into the opening end 41a of the discharge hole 41.

The plunger 1c is a cylindrical metal part that is inserted into the bearing hole 31 side of the cylinder hole 32 to be freely slide therein, one end of which protrudes toward an inside of the bearing hole 31, and the other end of which serves to form the pump chamber 1b therebetween together with the cover member 1a.

The bearing hole 31 is arranged therein with the eccentric cam 201 installed on an output shaft of the motor 200, and one end of the plunger 1c is in contact with an outer circumference face of the eccentric cam 201. Since the eccentric cam eccentrically rotates around the output shaft of the motor 200, when making the output shaft of the motor 200 rotate, the plunger 1c is pressed by the outer circumference face of the eccentric cam 201 thereby moving toward the pump chamber 1b side along an axis direction thereof.

Also, the other end of the plunger 1c is attached thereto with a supporting member 1e supporting one end of the coil spring 1d, which will be described later.

The coil spring 1d, one end of which is in contact with the supporting member 1e that is attached to the other end of the plunger 1c, and the other end of which is in contact with an outer surface (spherical surface) of the cover member 1a, is arranged within the pump chamber 1b in a compressed state.

The opening of the other end of the coil spring 1d is inserted therein with a part of surface of the cover member 1a, and the other end of the coil spring 1d is guided by the surface (spherical surface) of the cover member 1a. Thereby, an axis center of the coil spring 1d and a center of the cover member 1a are aligned, and the coil spring 1d and the cover member 1a are arranged on a coaxial position.

Since the coil spring 1d presses the plunger 1c toward the eccentric cam 201, when the outer circumference face of the eccentric cam 201 is displaced in a direction of receding from the plunger is after the plunger 1c is pressed by the eccentric cam 201 and thereby moves toward the pump chamber 1b, the coil spring 1d moves the plunger 1c toward the eccentric cam 201. That is, the plunger 1c moves toward the eccentric cam 201 in an axial direction by the pressing force of the coil spring 1d.

The pump chamber 1b, which is sectioned at an inside of the cylinder hole 32 by the plunger 1c, is communicated with the suction hole 46 and the lower portion of the discharge hole 41.

The suction hole 46 is installed therein with the suction valve 6 which is a check valve allowing only an inflow of brake fluid into the cylinder hole 32 (pump chamber 1b).

The suction valve 6 is arranged to be biased toward the reservoir hole 33, and includes a cylindrical member 6a, a suction valve body 6b sealing an opening of the cylindrical member 6a, a retainer 6c receiving the suction valve body 6b, and a spring member 6d secured in the retainer 6c.

The cylindrical member 6a is a cylinder shaped metal part and fitted into the opening end 46b of the suction hole 46. The center hole of the cylindrical member 6a at the cylinder hole 32 side is formed at an opening edge thereof with a valve seat which is expanded in a funnel shape.

The suction valve body 6b is a spherical metal part, and gets in contact with the valve seat of the cylindrical member 6a, thereby sealing the opening of the cylindrical member 6a.

The retainer 6c is a cylindrical cover having a bottom, and the opening of which is fitted to an outer side of the end of the cylinder hole 32 side of the cylindrical member 6a. The retainer 6c receives the suction valve body 6b therein.

The spring member 6d is a coil spring which is arranged in a compressed state between an inner face of the bottom of the retainer 6c and the suction valve body 6b, and presses the suction valve body 6b toward the opening of the cylindrical member 6a.

When the upper current side (pump chamber 1b side) becomes a state of negative pressure, the suction valve body 6b becomes separated from the opening of the cylindrical member 6a against the pressing force of the spring member 6d, thereby the suction valve 6 becomes an opened state.

The discharge hole 41 is installed therein with the discharge valve 7 which is a check valve allowing only a discharge of brake fluid from an inside of the cylinder hole 32 (pump chamber 1b).

The discharge valve 7 is disposed in the discharge hole 41, biased toward the cylinder hole 32, and includes a cylindrical member 7a that is fitted to an inside of the opening end 41b of the discharge hole 41, a discharge valve body 7b sealing an opening of the cylindrical member 7a, a retainer 7c receiving the discharge valve body 7b, and a spring member 7d secured in the retainer 7c. Meanwhile, an opening edge portion of the opening end 41b of the discharge hole 41 is reduced in its diameter, and functions as a stopper of the cylindrical member 7a.

The discharge valve 7 is a check valve having the same configuration as the suction valve 6, when the hydraulic pressure of the brake fluid value that a hydraulic pressure of the brake fluid of the lower current side subtracted from a hydraulic pressure of the brake fluid of the upper current side (pump chamber 1b side) is more than a valve opening pressure (pressing force of the spring member 7d), the discharge valve body 7b comes off an opening of the cylindrical member 7a against a pressing force of the spring member 7d, thereby the discharge valve 7 becomes an opened state.

In the plunger pump 1, when the plunger is pressed by an outer circumference face of the eccentric cam rotating and thereby moves toward the cover member 1a in a state that the pump chamber 1b is filled with a brake fluid, the volume of the pump chamber 1b decreases and the hydraulic pressure of the brake fluid thereby increases. Accordingly, the discharge valve 7 is opened and the brake fluid in the pump chamber 1b is thereby discharged from the discharge hole 41.

Next, after the plunger 1c moves closest to the cover member 1a and the volume in the pump chamber 1b thereby decreases to a minimum, when the outer circumference face of the eccentric cam 201 is displaced in a direction of receding from the plunger 1c while the eccentric cam 201 rotates, the plunger 1c moves toward the eccentric cam 201 by the pressing force of the coil spring 1d thereby returning to the original position, so that the volume of the pump chamber 1b increases.

In such a manner, when the pump chamber 1b increases in its volume and thereby becomes a state of negative pressure in the inside thereof, the suction valve 6 is opened and a brake fluid is suctioned into the pump chamber 1b through the suction hole 46.

And, when the plunger 1c moves to a position that is closest to the eccentric cam 201 and the volume of the pump chamber 30 thereby increases to a maximum, the plunger 1c is again pressed by the rotation of the outer circumference face of the eccentric cam 201 and thereby moves toward, the brake fluid in the pump chamber 1b is pressurized by the plunger 1c and is thereby discharged from the discharge hole 41, in the same manner as the forward movement described previously.

According to the vehicle hydraulic pressure of the brake fluid brake fluid pressure control device U configured thus, as shown in FIG. 4, since the inflow hole 45 and suction hole 46 each are installed separately, the cross sectional area may be set according to each object and the degree of freedom may accordingly be enhanced when a fluid passage within the base unit 100 is designed.

Accordingly, in the brake fluid pressure control device U according to an embodiment of the invention, the cross sectional area (inside diameter) of the suction hole 46 is formed more largely than the cross sectional area (inside diameter) of the inflow hole 45 thereby improving the suction efficiency of the plunger pump 1 from the reservoir 5 (see FIG. 5).

Also, in the brake fluid pressure control device U of the embodiment, as shown in FIG. 5, the suction valve 6 is disposed biased toward the reservoir hole 33 within the suction hole 46. In this configuration, since a brake fluid is suctioned from the reservoir 5 by a suction action occurred in the suction valve 6 disposed near the reservoir 5, the suction efficiency of the plunger pump 1 from the reservoir 5 may be improved.

Also, according to the brake fluid pressure control device U of the embodiment, as shown in FIG. 2, since the cross sectional area (inside diameter) of the discharge hole 41 is formed more largely than the cross sectional area (inside diameter) of the master cylinder connection hole 42, the discharge efficiency of the plunger pump 1 (see FIG. 5) is high.

Also, since the cross sectional area (inside diameter) of the master cylinder connection hole 42 is reduced smaller than the cross sectional area (inside diameter) of the discharge hole 41 and the cross sectional area of the fluid passage thereby becomes narrowed at a communication portion of the discharge hole 41 and the master cylinder connection hole 42, surging of a brake fluid discharged from the plunger pump 1 may be damped by orifice effect.

Also, as shown in FIG. 5, since the discharge valve is biased toward the cylinder hole 32 in the discharge hole 41, the space of the discharge hole 41 from the discharge valve 7 to the master cylinder connection hole 42 may function as a damping chamber for damping surging of a brake fluid discharged from the plunger pump 1.

Also, according to the brake fluid pressure control device U of the embodiment, as shown in FIG. 4, since the inflow hole 45 and the suction hole 46 are arranged in parallel, the inflow hole 45 and the suction hole 46 may be processed from a same direction to form the base unit 100, whereby the fluid passage may be easily processed. In addition, since the axial direction of the suction hole 45 and the axial direction of the inflow hole are arranged in parallel, the fluid passage may be more easily processed.

Also, according to the brake fluid pressure control device U of the embodiment, since the axial direction of the suction hole 46 and the discharge hole is at right angles to the axial direction of the cylinder hole 32, it is easy to lay out the entire fluid passage within the base unit 100 including the inlet valve mounting hole 34 or the outlet valve mounting hole 35 thereby enabling to use the space within the base unit 100 efficiently.

Also, according to the brake fluid pressure control device U of the embodiment, as shown in FIG. 3, since the outlet valve mounting hole 35 is arranged between the cylinder hole 32 and the reservoir hole 33 and the inflow hole 45 is short, the base unit 100 may be miniaturized.

Also, according to the brake fluid pressure control device U of the embodiment, as shown in FIG. 3, since the inlet valve mounting hole 34 and the outlet valve mounting hole 35 are arranged between the suction hole 46, the discharge hole 41 and the bearing hole 31 in an axial direction of the cylinder hole 32, the base unit 100 may be used efficiently in its space and thereby miniaturized.

Also, according to the brake fluid pressure control device U of the illustrative embodiment, as shown in FIG. 5, the cover member 41c provided in the discharge hole 41 and the cover member 1a provided in the cylinder hole 32 are formed in the same shape. In this manner, manufacturing cost may be reduced by sharing of parts.

As described in the foregoing, the invention has been described in detail with reference to embodiment. However, it will be appreciated by those skilled in the art that changes may be made in this embodiment without departing from the principles and spirit of the invention.

For example, in the embodiment, as shown in FIG. 3, the inlet valve mounting hole 34 and the outlet valve mounting hole 35 each are separately installed in each of the fluid passage section 100A and the fluid passage section 1008 thereby the front wheel brake and rear wheel brake each are braked independently from each other. However, a plurality of the inlet valve mounting hole 34 and the outlet valve mounting hole 35 may be installed in each of the fluid passage sections 100A, 100B, thereby it may also be possible to interlock and thereby brake the front wheel brake and the rear wheel brake.

Also, the embodiment, the brake fluid pressure control device U is applied to a bar handle type vehicle. However, the brake fluid pressure control device U may be applied to various kinds of vehicles such as a four-wheel automobile and the like.

Although the embodiments according to the present invention have been described above, the present invention is not limited to the above-mentioned embodiment but can be variously modified. Constituent components disclosed in the aforementioned embodiments may be combined suitably to form various modifications. For example, some of all constituent components disclosed in the embodiment may be removed or may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A brake fluid pressure control device for a vehicle comprising:
   an inlet valve that is configured by a normally opened type electronic valve;
   an outlet valve that is configured by a normally closed type electronic valve;
   a reservoir that temporarily stores a brake fluid;
   a plunger pump that suctions the brake fluid stored in the reservoir; and
   a base unit having a fluid passage that connects a master cylinder and a wheel cylinder,
   wherein the base unit comprises:
   an inlet valve mounting hole in which the inlet valve is mounted;
   an outlet valve mounting hole in which the outlet valve is mounted;
   a reservoir hole in which the reservoir is mounted;
   a cylinder hole into which a plunger of the plunger pump is inserted to freely slide in the cylinder hole;
   an inflow hole that connects the outlet valve mounting hole and the reservoir hole;
   a suction hole that connects the reservoir hole and the cylinder hole; and
   a discharge hole that connects the cylinder hole and the inlet valve mounting hole,
   wherein the suction hole is configured to be inserted with a suction valve that allows only an inflow of the brake fluid into the cylinder hole, wherein the discharge hole is configured to be inserted with a discharge valve that allows only a discharge of the brake fluid from the cylinder hole,
   wherein the inflow hole and the suction hole are arranged to be substantially in parallel with each other,
   wherein the base unit comprises an inlet port that is connected to a pipe extended to the master cylinder,
   wherein the discharge hole is connected to a master cylinder connection hole that is communicated with the inlet port, and
   wherein a cross sectional area of the discharge hole is formed to be larger than a cross sectional area of the master cylinder connection hole.

2. The brake fluid pressure control device according to claim 1,
   wherein the suction hole and the discharge hole are arranged to be substantially perpendicular to the cylinder hole.

3. The brake fluid pressure control device according to claim 1, wherein an axial line of the suction hole and an axial line of the inflow hole are substantially in parallel with each other.

4. The brake fluid pressure control device according to claim 1,
   wherein the outlet valve mounting hole is arranged between the cylinder hole and the reservoir hole.

5. The brake fluid pressure control device according to claim 1,
   wherein a cross sectional area of the suction hole is formed to be larger than a cross sectional area of the inflow hole.

6. The brake fluid pressure control device according to claim 1,
   wherein the suction valve is disposed at a position displaced deviated from the center of the suction hole toward the reservoir hole.

7. The brake fluid pressure control device according to claim 1,
   wherein the discharge valve is disposed at a position deviated from the center of the discharge hole toward the cylinder hole.

8. The brake fluid pressure control device according to claim 7, further comprising a damper chamber provided within the discharge hole from the discharge valve to the master cylinder connection hole which damps surging of a brake fluid discharged from the plunger pump.

9. The brake fluid pressure control device according to claim 1,
   wherein the discharge hole is connected to the cylinder hole at one end thereof and sealed at the other end thereof by a first cover member,
   wherein the cylinder hole is inserted with the plunger at one end thereof and sealed by a second cover member at the other end thereof, and
   wherein the first cover member and the second cover member are formed to have substantially the same shape.

10. The brake fluid pressure control device according to claim 1,
    wherein the cylinder hole is connected to a bearing hole at one end thereof, the bearing hole being inserted with an output shaft of a motor, and
    wherein the inlet valve mounting hole and outlet valve mounting hole are arranged between the suction hole, the discharge hole and the bearing hole in an axial direction of the cylinder hole.

11. The brake fluid pressure control device according to claim 10,
    wherein the base unit further comprises:
    a first fluid passage section for a first brake system of a first wheel brake; and a second fluid passage section for a second brake system of a second wheel brake,
wherein each of the first fluid passage section and the second fluid passage section is provided with the inlet valve mounting hole and the outlet valve mounting hole.

12. The brake fluid pressure control device according to claim 11,
wherein the brake fluid pressure control device is installed in a vehicle of a bar handle type.

13. The brake fluid pressure control device according to claim 1,
wherein the cylinder hole is connected to a bearing hole at one end thereof,
wherein the bearing hole is inserted with an output shaft of a motor, and
wherein the inlet valve mounting hole and the outlet valve mounting hole are arranged between the suction hole, the discharge hole and the bearing hole in an axial direction of the cylinder hole.

14. The brake fluid pressure control device according to claim 1,
wherein the inlet valve mounting hole is a cylinder shaped hole having an opened bottom at a front face of the base unit, and is disposed between an outlet port and the cylinder hole,
wherein the outlet valve mounting hole is a cylinder shaped hole having an opened bottom at the front face of the base unit, and is disposed between the cylinder hole and the reservoir hole at a lower side of the inlet valve mounting hole,
wherein the discharge hole is a cylinder shaped hole which is communicated with the cylinder hole from an upper face of the base unit, and is crossed at right angles to an axial line of the cylinder hole, and
wherein the discharge hole is arranged close to a side face of the base unit compared with the inlet valve mounting hole, and a lower portion of the discharge hole is communicated with about a center portion of the cylinder hole when viewed in left and right directions.

15. The brake fluid pressure control device according to claim 14, wherein
the inlet valve mounting hole is arranged between the discharge hole and a bearing hole when viewed in an axial direction of the cylinder hole.

16. The brake fluid pressure control device according to claim 1, wherein
the cross-sectional area of a master cylinder connection hole is formed smaller than that of the discharge hole such that the cross sectional area becomes narrowed at a communication portion between the discharge hole and the master cylinder connection hole.

17. The brake fluid pressure control device according to claim 1,
wherein an electronic valve connection hole is a cylinder shaped hole which is communicated from a bottom of an outlet port to the inlet valve mounting hole and the outlet valve mounting hole,
wherein the inflow hole is a cylindrical hole that is communicated from the outlet valve mounting hole to a bottom portion of the reservoir hole, and an axial line of the inflow hole is in parallel with an axial line of the discharge hole, and
wherein the suction hole is a cylindrical hole that is communicated from the bottom portion of the reservoir hole to the cylinder hole, and an axial line of the suction hole is crossed at right angles to an axial line of the cylinder hole and with the discharge hole.

18. The brake fluid pressure control device according to claim 17,
wherein the suction hole is arranged closer to a side face of the base unit compared with the outlet valve mounting hole,
wherein an upper portion of the suction hole is communicated with about a center portion of the cylinder hole, and
wherein the discharge valve mounting hole is arranged between the suction hole and a bearing hole in an axial direction of the cylinder hole.

19. The brake fluid pressure control device according to claim 1,
wherein an opening end of the suction hole at a side of the reservoir hole is expanded in its diameter,
wherein the suction hole and the discharge hole are arranged in upper and lower directions with the cylinder hole interposed therebetween, and
wherein the suction hole and the inflow hole are arranged in parallel with each other such that an axial line of the suction hole and an axial line of the inflow hole are in parallel.

20. The brake fluid pressure control device according to claim 1,
wherein the reservoir comprises:
a piston which is mounted to be freely slide within the reservoir hole;
a board shaped spring supporting member which is attached to a lower face of the base unit to close an opening of the reservoir hole; and
a coil spring which is installed between the piston and the spring supporting member to press the piston toward a lower face of the reservoir hole, wherein
the reservoir hole is communicated with the inflow hole and the suction hole at a lower face thereof such that when a brake fluid flows into the reservoir hole from the inflow hole, the piston moves toward the spring supporting member side against elastic forces of the coil spring, thereby a brake fluid is stored in the reservoir hole; and
wherein the plunger pump comprises:
a cover member which seals an opening end in the cylinder hole and is made in a same shape as a cover member which is fitted into an opening end of the discharge hole,
the plunger which is mounted in the cylinder hole to be freely slide therein and serves to form a pump chamber therebetween together with the cover member, and
a coil spring which is arranged in a pump chamber and presses the plunger toward an eccentric cam.

21. The brake fluid pressure control device according to claim 1, wherein the plunger pump comprises:
a cover member that seals one end of the cylinder hole, and
a spring that is disposed between the plunger and the cover member, presses the plunger, and is in contact with the cover member.

* * * * *